(No Model.)
H. B. SKIDMORE.
CORN CULTIVATOR.
No. 579,844. Patented Mar. 30, 1897.
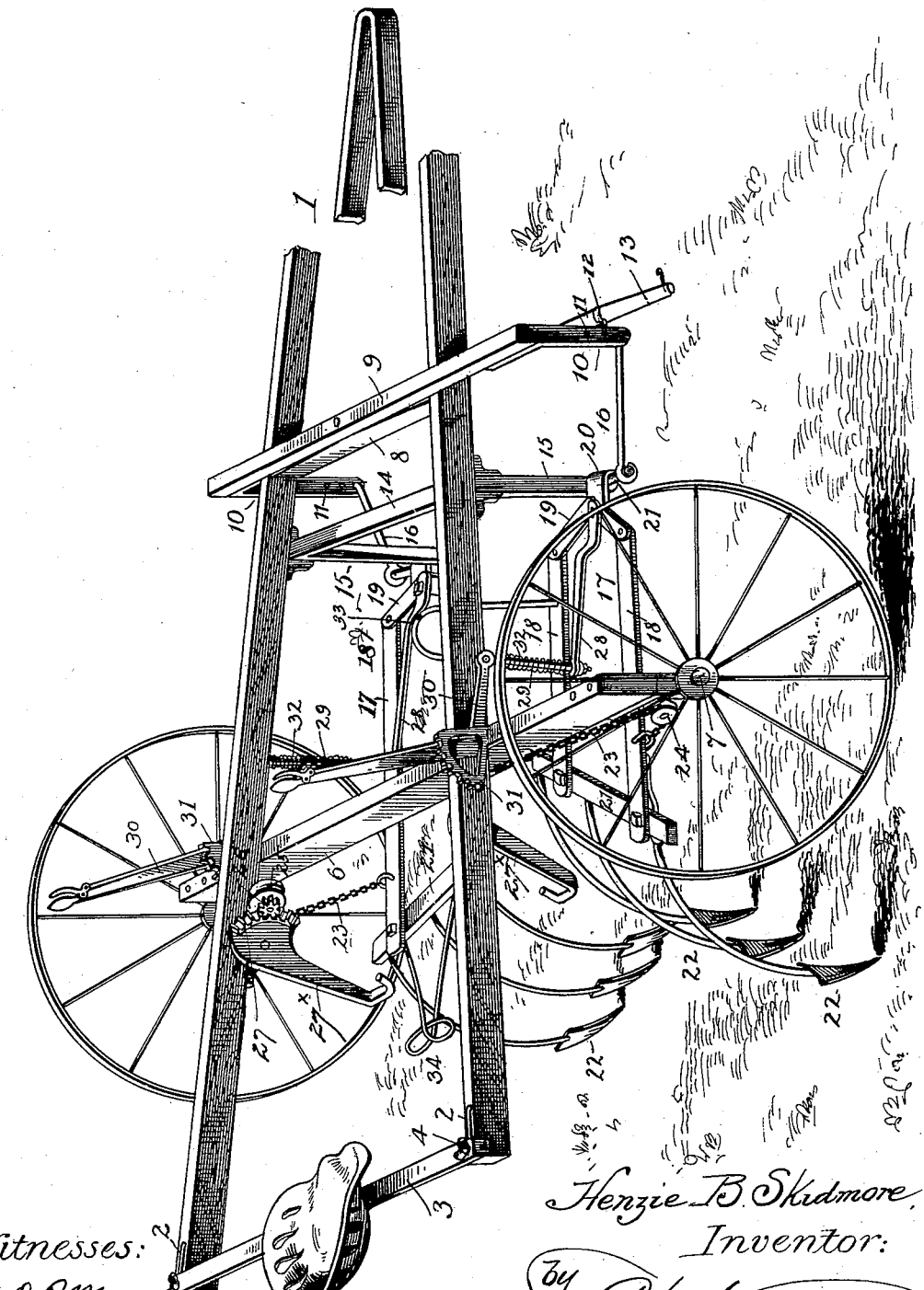
Witnesses:
D. P. Moore
May E. Moore
Henzie B. Skidmore, Inventor:
by Wm N. Moore
Attorney

UNITED STATES PATENT OFFICE.

HENZIE B. SKIDMORE, OF UNION CITY, OHIO.

CORN-CULTIVATOR.

SPECIFICATION forming part of Letters Patent No. 579,844, dated March 30, 1897.

Application filed June 2, 1896. Serial No. 593,971. (No model.)

*To all whom it may concern:*

Be it known that I, HENZIE B. SKIDMORE, a citizen of the United States, residing at Union City, in the county of Darke and State of Ohio, have invented certain new and useful Improvements in Corn-Cultivators; and I do hereby declare the following to be a full, clear, and exact description of the invention, such as will enable others skilled in the art to which it appertains to make and use the same.

My invention relates to improvements in corn-cultivators of that class known as "sulky" or "riding" cultivators; and the object of my invention is the provision of means which can be readily controlled by the rider to shift the gangs of plows or teeth with reference to the line-draft, and also to provide means under the control of the rider for raising and lowering the gangs of plows as circumstances require.

Another object of my invention is the provision of a cultivator having the gangs of plows provided with the shifting and raising and lowering devices, which will be of simple and inexpensive construction and durable and practical.

To attain the desired objects, my invention consists of a corn-cultivator embodying novel features of construction and combination of parts, substantially as disclosed herein.

The figure represents a perspective view of a corn-cultivator embodying my invention.

Referring by numerals to the drawing, the numeral 1 designates the longitudinal beams which form the framework and tongue by which the machine is drawn by horse-power, and to the rear ends of said beams are secured the springs 2, upon which is mounted the seat-carrying bar 3, which is adjustable on said springs by means of the set-screws 4, and said bar carries the driver's seat 5. To said frame is also connected the cross piece or bar 6, which has the axles or spindles 7 to receive the supporting-wheels. Also connected with said frame is the cross-bar 8, upon which is mounted the bar 9, having the depending draft-equalizing devices 10 mounted on the under side thereof and having a series of openings 11 to receive the rings 12 on the singletrees 13. By this construction the draft may be adjusted vertically, and the pivotal connection of the cross-bar has an equalizing effect upon the draft, enabling the horses to readily draw the cultivator over the ground.

In rear of the pivotal bar and rigidly secured to the frame-bars is the arch-shaped frame 14, having the projections or extensions 15 extending laterally from said frame, and said projections are connected with the draft devices by means of the links or rods 16. To said extensions 15 are also connected the plow-frames 17, which consist each of the parallel side bars 18, the hinged front piece 19, having the tube or sleeve 20, which fits on the tubular extension of the arch-shaped frame, and of the rear cross-piece 21, the whole forming a light but very strong and durable frame, to which are connected the plows 22, making the two similar gangs, and said plows are of any well-known construction.

To the outer bars of the plow-frame is connected the lower end of the chains 23, which pass from the plow-frame over the guide-pulleys 24 and have their upper ends connected to the upper end of the pulleys 25, mounted on the frame and having the gear-wheels 26, which mesh with the racks 27 on the upper ends of the foot-levers 27ˣ, and by this construction it will be seen that the driver can, by pressing his foot upon the foot-lever, through the medium of the gears and chains connected to the plow-frames shift said frames laterally as desired. To the forward portion of said plow-frames is connected the outer end of the rods 28, the inner ends whereof are connected by means of the rods 29 with the lower end of the levers 30, having the detent for holding said levers at any adjustment upon the racks 31, and around said rods 29 are placed the coiled springs 32, the purpose of which is to regulate the depth of the plows and also to render easy the raising and lowering of the frames, and it will be seen that when the driver desires to raise or lower the frames it can be readily accomplished through the medium of the hand-levers.

The plow-frames are connected by means of the flexible or hinged connection 33, which enables the frames to be brought close together or to be spread apart, and I further provide the frames at their rear ends with the foot attachment 34, (shown only on one of the frames,) which enables the driver to use either power independent and to force said plows into the ground by pressure of the foot or to raise them when desired.

From the foregoing description, taken in connection with the drawing, it is evident that I provide a cultivator which will permit the use of one or both of the gangs of plows, which will enable the plows to be thrown into or out of use, which will allow them to be shifted as desired, and which is generally efficient in every particular, and further comment is deemed unnecessary.

I claim—

1. In a cultivator, the combination of the frame, the supplemental frame supported thereby, the plow-frames flexibly connected together and also connected with the supplemental frame and carrying the plows, the chains connected to said plow-frames, the foot-levers having each a rack at their upper ends and the pinions engaging the rack of the foot-levers, said pinions being connected with the chains, whereby the plow-frames are shifted laterally by moving the foot-levers.

2. In a cultivator, the combination of the frame, the plow-frames supported therefrom, the rods or links having one end connected to said plow-frames, the rods connected to the other end of said rods or links, the springs coiled around the latter rods, the hand-levers connected to said rods for lifting the plow-frames vertically and lowering the same, and foot mechanism for shifting the plow-frames laterally, consisting of the foot-levers having a rack at their upper ends, pinions operated by said rack and connections between the pinions and plow-frames for shifting said frames.

3. In a cultivator, the combination of the main frame, the supplemental frame supported thereby, the draft devices connected with the supplemental frame, the plow-frames each consisting of two parallel bars joined at the rear by a transverse bar and at the front by two angular bars pivoted to the supplemental frame at the apex of said angular bars, hand-operating mechanism for raising and lowering said plow-frames, and foot mechanism for shifting the plow-frames laterally, consisting of the foot-levers having a rack at their upper ends, pinions operated by said rack and connections between the pinions and plow-frames for shifting said frames.

4. In a cultivator, the combination of a main frame, the plow-frames carrying the plows and loosely supported at their upper ends from the main frame, the hand-levers connected with said plow-frames for raising and lowering the frames, the chains connected to the plow-frames at one end, the pinions connected with the other ends of the chains, and the foot-levers formed with a rack for engaging the pinion to shift the frames laterally.

In testimony whereof I affix my signature in presence of two witnesses.

HENZIE B. SKIDMORE.

Witnesses:
  GEO. WELLS SMITH,
  CRATE P. BOWEN.